United States Patent [19]

Broske

[11] 3,759,551

[45] Sept. 18, 1973

[54] EXPLOSIVELY-FORMED TUBULAR CONNECTION

[75] Inventor: William F. Broske, Camp Hill, Pa.

[73] Assignee: AMP Incorporated, Harrisburg, Pa.

[22] Filed: July 10, 1972

[21] Appl. No.: 270,371

Related U.S. Application Data

[63] Continuation of Ser. No. 887,020, Dec. 22, 1969, abandoned, which is a continuation of Ser. No. 691,307, Dec. 18, 1967, abandoned.

[52] U.S. Cl. .................... 285/18, 29/516, 285/382.2

[51] Int. Cl. .................... F16l 13/14

[58] Field of Search .................... 285/18, 369, 382.1, 285/382.2, 383, 381, 417, DIG. 7; 287/104, 109; 29/254, 474, 497.5, 421, 470.1, 508, 510, 515, 516, 517, 519, 520, 521, 421 E; 228/3

[56] References Cited

UNITED STATES PATENTS

| | | | |
|---|---|---|---|
| R26,685 | 10/1969 | Broske | 174/94 R |
| 1,959,402 | 5/1934 | Anderson | 29/519 X |
| 2,816,211 | 12/1957 | Hutchins | 285/382.2 X |
| 2,958,929 | 11/1960 | Vineberg et al. | 29/516 |
| 3,341,650 | 9/1967 | Broske | 287/109 X |
| 3,343,252 | 9/1967 | Reesor | 285/382.2 X |

FOREIGN PATENTS OR APPLICATIONS

| | | | |
|---|---|---|---|
| 172,146 | 12/1921 | Great Britain | 285/381 |

*Primary Examiner*—J. Karl Bell
*Attorney*—Marshall M. Holcombe et al.

[57] ABSTRACT

An end portion of a first tubular member is inserted within the end portion of a second tubular member and a die means is disposed in surrounding relation to said second tubular member. Explosive means is disposed adjacent to said die means, and the components are confined within a closed chamber. Detonation of explosive means moves the die means along the second tubular member to cold-forge the second tubular member to the first tubular member.

6 Claims, 5 Drawing Figures

10 76 82 80 114 112 92 90 74 12 78 50 46 70 72 88 79 86 96 98 56 60 75 84 100 110 102 94 14

12
50
22
10
52
20
60
40
18
62
14
16
26
24
48
42
30
36
46
28
56
58
38

10
114
112
92
90
74
12
76
82
80
78
46
50
70
72
88
79
86
96
98
56
60
75
84
100
110
102
94
14

EXPLOSIVELY-FORMED TUBULAR CONNECTION

This is a streamlined continuation of application Ser. No. 887,020, filed Dec. 22, 1969, which is in turn a continuation of application Ser. No. 691,307, filed Dec. 18, 1967, and now abandoned.

BACKGROUND OF THE INVENTION

The present invention relates to tubular connections, such as pipe couplings or other tubular or conduit members, to be connected to one another and provide a fluid-tight joint.

The present invention is adapted to be employed with tubular members, such as pipes up to 12 inches or more in diameter. Such large pipes have in the past been welded together when it is desired to provide a fluid-tight connection therebetween as in pipelines and the like. Such welding procedures are undesirable since the cost is high and it is difficult to weld pipes of this size in the field. These procedures are additionally time-consuming and a completely fluid-tight joint is not always obtained.

In order to overcome the difficulties encountered in welding pipes together, equipment has been provided in the prior art for swaging pipes together. This equipment is hydraulically operated. The prior art swaging equipment has employed double-acting cylinders to obtain a reverse stroke of the swaging means since the pipes have a tendency to spring back in a radial direction thereby tending to make a loose joint between the swage pipes. The large size required of such hydraulic equipment considerably limits the maneuverability and portability thereof, and the equipment is additionally quite expensive. Furthermore, the size of the pipe which can be handled by such equipment is also severly limited.

SUMMARY OF THE INVENTION

In the present invention, an explosively formed tubular connection is provided. The present invention is related to the invention disclosed in U.S. Pat. No. 3,341,650 which is directed to an explosively-formed electrical connection. The present invention employs a similar inventive concept in providing a fluid-tight connection between tubular members. In the invention, a confining means is provided and telescoping tubular members are provided therewithin. Movable die means is then disposed about the tubular members and is explosively operated to cold-forge the tubular members together. This type of operation, of course, completely eliminates the necessity of welding the tubular members together.

Additionally, the compact arrangement of the present invention eliminates the necessity of providing hydraulic equipment, and accordingly provides a much cheaper means of connecting tubular members together which is more compact than the hydraulic equipment heretofore employed and much more portable. An additional advantage of the present invention is the fact that relatively large size tubular members can be successfully connected to one another.

A further advantage of the present invention is the fact that peripherally extending depressions are provided in the tubular members, these depressions fitting one within the other and being cold-forged together so as to enhance the seal between the contacting portions of the tubular members.

An object of the present invention is to provide a new and novel explosively formed tubular connection which eliminates the necessity of welding the tubular members together or employing bulky expensive hydraulic equipment to swage the members together; and wherein relatively large size tubular members can be successfully connected together to provide a very effective fluid-tight connection.

DESCRIPTION OF THE PREFERRED EMBODIMENTS

Figures 1, 2:
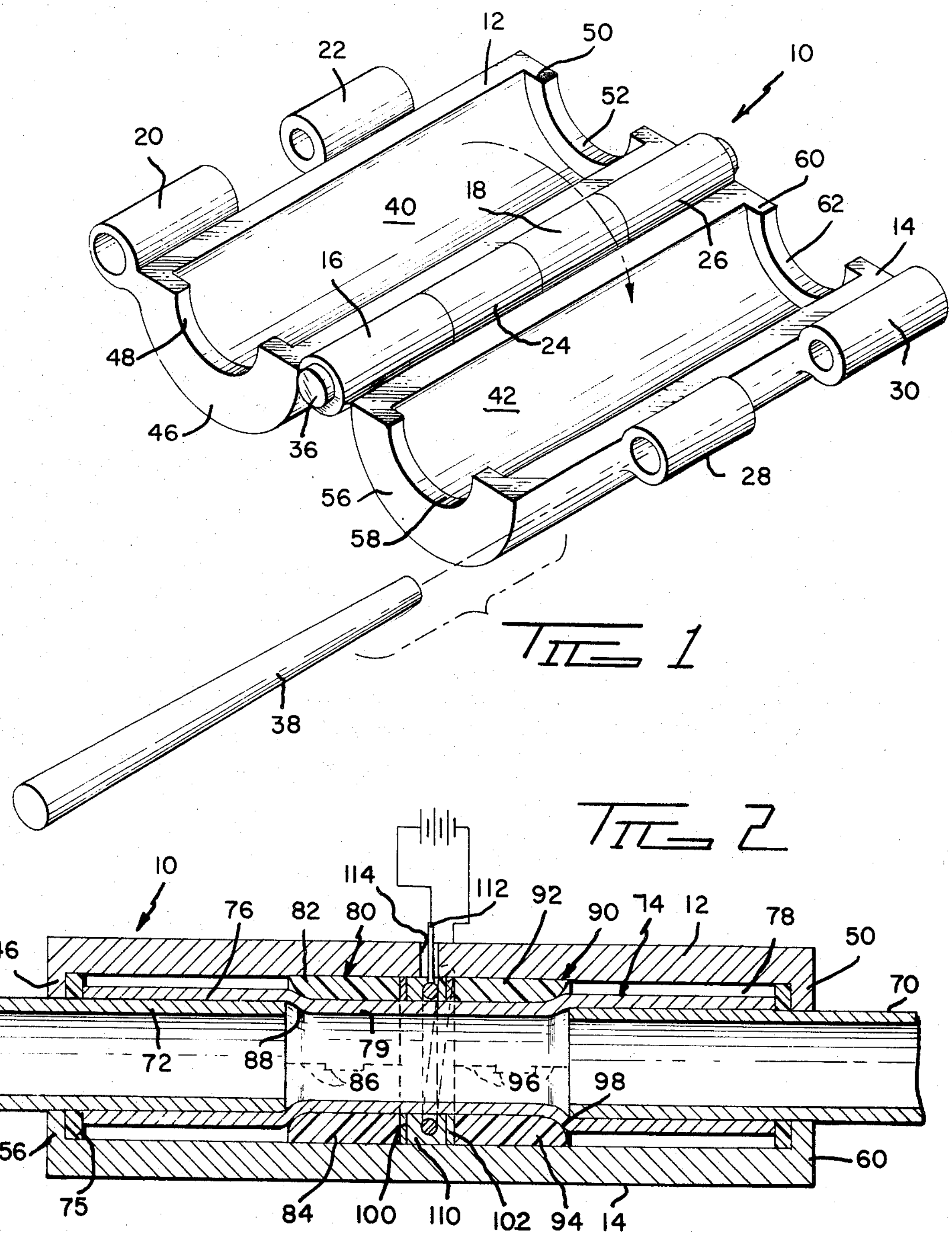
FIG. 1 is a top perspective view illustrating a confining means according to the present invention in its open position.
FIG. 2 is a longitudinal section through the confining means shown in FIG. 1, with tubular members to be connected disposed therewithin and with certain other components of the apparatus therewithin.

Referring now to the drawings wherein like reference characters designate corresponding parts throughout the several views, FIG. 1 illustrates the confining means in its open position. The confining means is indicated generally by reference numeral 10 and includes two movable portions 12 and 14. This confining means is formed of a suitable rigid substance, such as steel or the like, adapted to withstand the pressures applied thereto in use.

Member 12 includes integral tubular portions 16 and 18 extending from one side thereof and having cylindrical holes formed therethrough. A pair of similar tubular portions 20 and 22 extend from the opposite side thereof, each of portions 20 and 22 having tapered holes formed therethrough for a purpose hereinafter described.

Member 14 has a first pair of integral spaced tubular portions 24 and 26 extending from one side thereof, and a second pair of integral tubular spaced portions 28 and 30 extending from the opposite side thereof, portions 24 and 26 having cylindrical holes formed therethrough and portions 28 and 30 having tapered holes formed therethrough.

As seen in the assembled position shown in FIG. 1, the portions 16 and 18 of member 12 and portions 24 and 26 of member 14 are staggered with respect to one another so that they are adapted to fit together to form a tubular portion through which a cylindrical hinge pin 36 extends for connecting members 12 and 14 for pivotal movement with respect to one another.

The portions 20 and 22 of member 12 are staggered with respect to the portions 28 and 30 of member 14 so that when member 12 is swung into the closed operative position, portions 20 and 22 will be aligned with portions 28 and 30 so that a tapered pin 38 may be driven through the aligned tapered holes formed in portions 20, 28, 22 and 30, respectively, it being understood that the holes through these respective members are tapered so as to be complementary to the outer surface of pin 38 whereby the pin is adapted to be driven into place within the tapered holes to hold the two members 12 and 14 in assembled relationship when employing the confining means.

Member 12 has a substantially, semi-cylindrical recess 40 disposed therewithin, and member 14 has a similar substantially semi-cylindrical recess 42 formed therein such that when the two members 12 and 14 of the confining means are disposed in operative relationship, the recesses 40 and 42 cooperate to provide a substantially cylindrical recess therewithin.

Member 12 includes a first end wall 46 having a substantially semi-circular cutout 48 formed therein, and the opposite end wall 50 of member 12 has a substantially semi-circular cutout 52 formed therein. In a similar manner, member 14 is provided with an end wall 56 having a substantially semi-circular cutout 58 formed therein, while the opposite end wall 60 has a substantially semi-circular cutout 62 formed therein.

It is apparent that when the confining means is in its closed operative position, cutouts 48 and 58 will cooperate to form a circular hole at one end of the confining means, while outputs 52 and 62 will cooperate to form a circular hole at the opposite end of the confining means, each of these holes providing communication with the cylindrical chamber within the closed confining means.

Referring now to FIG. 2 of the drawings, the confining means is shown in its closed position and a pair of tubular members 70 and 72, such as pipes formed of metal or other suitable substance, have been inserted through the holes at the opposite ends of the confining means and are fitted snugly within such holes. A further tubular or connector member is indicated generally by reference numeral 74 and may be formed of a similar substance through the tubular members 70 and 72. Tubular member 74 includes opposite end portions 76 and 78 which snugly receive the two end portions of tubular members 72 and 70, respectively, the end portions 76 and 78 being joined by an intermediate portion 79 of reduced outer diameter.

It will be noted, as seen in FIG. 2, that the length of member 74 is such that it is slightly shorter than the length of the chamber defined within the confining means.

A pair of die means are provided, the first die means being indicated generally by reference numeral 80 and including a pair of members 82 and 84 which, when joined together, complement each other to define a right-circular cylinder. The die members are similar to those shown in the previously mentioned patent application, and each die member includes a series of dovetail joints 86 which have a friction-fit to permit the die means to be assembled in operative position. When in assembled relationship as illustrated, a hole is defined therethrough which tapers inwardly, as indicated at 88, from the left-hand end of the die means.

A similar die means 90 includes a pair of members 92 and 94 having cooperating joints 96 which also interfit with one another to provide the complete die means. A hole is defined by the die members 92 and 94, this hole tapering inwardly as indicated by reference numeral 98 from the righthand end of the member 92 and the left-hand end 98'' of the member 94, as seen in the drawing.

It will be noted that the die means 80 and 90 are adapted to fit snugly about the intermediate portion 79 of tubular member 74, the outer surfaces of the die means fitting snugly within the chamber defined within the confining means, each of the die means being slidably mounted within the chamber.

The die means may be made out of a suitable metal, or even a sufficiently stiff plastic as polycarbonate resin, macerated phenolic, or "Masonite," glass-filled polycarbonates, etc.

A pair of seal means 100 and 102 are provided and may be formed as split rings for ease of assembly, or may be made in two parts in a manner similar to the die means and interfitted with one another if desired. These seal means are for the purpose of confining gases generated by the explosive means, hereinafter described, and may be made of polyethylene, or similar material having suitable properties.

An explosive means is indicated generally be reference numeral 110 and comprises a powder charge disposed about the intermediate portion 79 of tubular member 74 and between the seal means 100 and 102. This powder charge may be either a molded charge or a quantity of granulated explosive powders held in the position illustrated. A detonating means 112 in the form of a wire comprising an alloy of palladium and aluminum, sold under the trademark of PYROFUZE, extends around mid-section 79 of the member 74 centrally of the powder charge and comes out through hole 114 provided in member 12 of the confining means for detonating the powder charge when so desired.

It will be noted that each of the die means, as well as the seal means and the explosive means, is of generally annular configuration so as to fit about the tubular member 74.

As shown in FIG. 2, a pair of rings 75, 75'' are disposed around the tubes 70 and 72, respectively. These rings act as cushions so that the dies 80 and 90 will not smash against the inner surface of the end walls 46, 50, 56 and 60. The rings also permit longitudinal extrusion of the tubular member 74.

After the components have been assembled into the operative position shown in FIG. 2, detonation of the powder charge (e.g., by an electrical charge B) drives the die means 80 and 90 towards the ends of the chamber causing the end portion 76 of tubular member 74 to be swaged radially inwardly onto the end portion of tubular member 72, thereby cold-forging these end portions of the two respective tubular members to one another. Simultaneously, the end portion 78 of tubular member 74 is swaged onto the outer end portion of tubular member 70, thereby cold-forging these two tubular members to one another.

The die means 80 and 90 are driven toward the ends of the chamber within the confining means, and the movement of die means 80 is limited by contact with the end walls 46 and 56, while the movement of die means 90 is limited by contact with the end walls 50 and 60. When the die means constricts the member 74, it causes the member 74 to be extruded longitudinally (FIG. 5).

Figure 3:
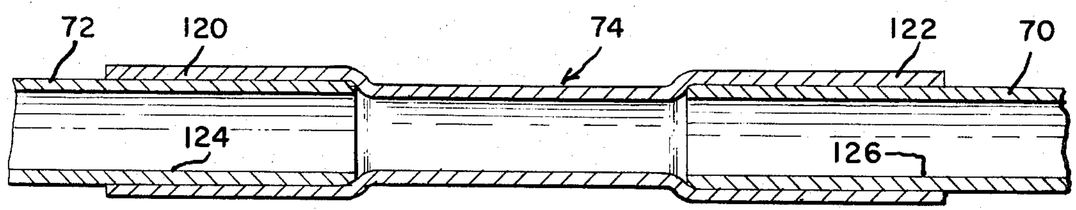
FIG. 3 illustrates the finished article after it has been removed from the position shown in FIG. 2, subsequent to cold-forging the tubular members to one another.

As seen in FIG. 3, it will be noted that the end portions of tubular members 70 and 72 have been reduced in diameter. The tubular member 74 is cold-forged to tubes 70 and 72 to provide a seal between the contacting surfaces of the associated tubular members.

Figure 4:
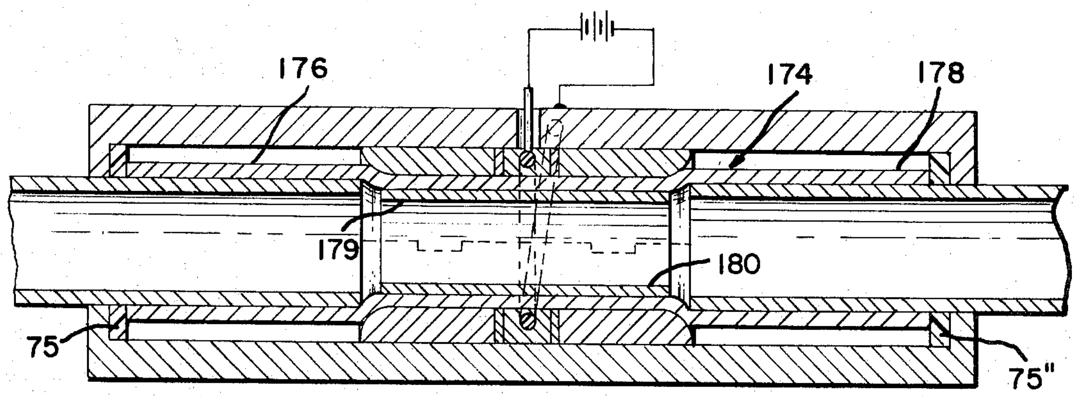
FIG. 4 is a view similar to FIG. 2 illustrating the modification of the present invention.

Referring now to FIG. 4, the arrangement is substantially the same as that shown in FIG. 2, and the same components have been given the same reference numerals primed. The only difference in the structure shown in FIG. 4 from that shown in FIG. 2 is the fact that the intermediate tubular member in this form of the invention is provided with the reference numeral 174 and includes opposite end portions 176 and 178 which are joined by an intermediate portion 179. It will be noted that this intermediate portion 179 is provided with an inner sleeve 180 secured within the tubular member to form a thickened wall portion as compared to the remaining wall thickness of the tubular member. This thickened wall portion serves to reinforce the central part of the tubular member so that it can better withstand the pressures applied thereto when the explosive charge is initially detonated and to resist any possible deformation in the central portion of tubular member 174.

Figure 5:
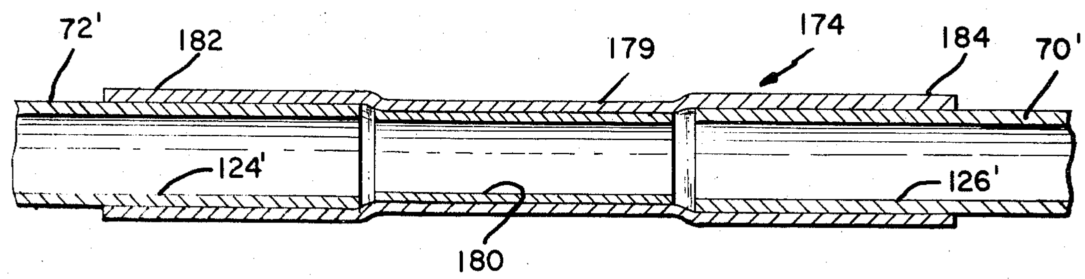
FIG. 5 is a view similar to FIG. 3, illustrating the finished article subsequent to cold-forging of the components illustrated in FIG. 4.

Referring now to FIG. 5, this view illustrates the completed article when utilizing the tubular member 174 having the thickened intermediate wall portion. It will be noted that the inner surface of the intermediate portion 179 of tubular member 174 is of substantially the same inner dimension as the adjacent portions of the tubular members 72' and 70'.

It is apparent from the foregoing that there is provided, according to the present invention, a new and novel, explosively-formed tubular connection which eliminates the necessity of welding or using bulky expensive hydraulic equipment. The connection can be made quite cheaply with readily portable apparatus, and relatively large size tubular members can be interconnected according to the present invention.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional, as well as conjointly cooperative equivalents, are therefore intended to be embraced by those claims. What is claimed is:

1. A tubular connection comprising a first tubular member and a second tubular member, an end portion of said first tubular member being disposed within an enlarged end portion of said second tubular member, said end portions of the tubular members being cold-forged together through both a radially inward swaging and a longitudinal extrusion of said second tubular member, developed by die members driven explosively along the outer surface thereof, over the outer surface of said first tubular member.

2. Apparatus as defined in claim 1 wherein the inner surface of a non-enlarged portion of said second tubular member is of substantially the same inner dimension as the inner surface of said first tubular member.

3. Apparatus as defined in claim 1 including a third tubular member, an end portion of said third tubular member being disposed within the opposite and also enlarged end portion of said second tubular member, the contacting end portions of said third tubular member and said second tubular member also being cold-forged together due to a radially inward swaging and a longitudinal extrusion of said opposite end portion of said second tubular member, developed by further die members driven explosively along the outer surface thereof, over the outer surfaces of said second tubular member.

4. A tubular connection comprising a first tubular member and a second tubular member, an end portion of said first tubular member being disposed within an end portion of said second tubular member, said end portions of the tubular members being cold-forged together through a longitudinal extrusion and also through a radially inward swaging of said second tubular member developed by die members driven along the outer surface thereof by a force generated by the burning of a propellant charge, the outer surface of said first tubular member and a portion of the outer surface of said second tubular member being of substantially the same outer dimension.

5. A tubular connection comprising a first tubular member and a second tubular member, an end portion of said first tubular member being disposed within an end portion of said second tubular member, said first and said second tubular members having said end portions cold-forged together through a longitudinal extrusion and also through a radially inward swaging of said second tubular member developed by die members driven explosively along the outer surface thereof, the outer surface of said first tubular member and a portion of the outer surface of said second tubular member having substantially the same outer dimension.

6. A tubular connection comprising a first elongated tubular member of a predetermined constant outer diameter, a second elongated tubular member also of the same predetermined constant outer diameter, and a tubular coupling member having a central portion of a given inner diameter and two opposed end portions of an inner diameter larger than said center portion, an end portion of said first tubular member being disposed within one of the end portions of said tubular coupling member and an end portion of said second tubular member being disposed within the other end portion of said tubular coupling member, said first and said second tubular members having said end portions cold-forged to the respective end portions of said tubular coupling member through a longitudinal extrusion and also through a radially inward swaging of the said end portions of said tubular coupling member developed by die members driven explosively along the outer surface thereof, and the outer diameter of the central portion of said tubular coupling member being substantially equal to said predetermined constant outer diameter.

* * * * *